US010187544B2

(12) United States Patent
Ono et al.

(10) Patent No.: US 10,187,544 B2
(45) Date of Patent: Jan. 22, 2019

(54) SYSTEM, OUTPUT APPARATUS, AND SERVER DEVICE

(71) Applicant: FUJI XEROX CO., LTD., Tokyo (JP)

(72) Inventors: Masafumi Ono, Kanagawa (JP); Keita Sakakura, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/479,886

(22) Filed: Apr. 5, 2017

(65) Prior Publication Data
US 2018/0035004 A1    Feb. 1, 2018

(30) Foreign Application Priority Data

Jul. 26, 2016    (JP) .................................. 2016-146827

(51) Int. Cl.
| H04N 1/00 | (2006.01) |
| H04N 1/32 | (2006.01) |
| G06F 3/12 | (2006.01) |
| G06K 15/02 | (2006.01) |

(52) U.S. Cl.
CPC ..... *H04N 1/32432* (2013.01); *H04N 1/00095* (2013.01); *H04N 1/00212* (2013.01); *H04N 1/00344* (2013.01); *H04N 2201/0094* (2013.01)

(58) Field of Classification Search
None
See application file for complete search history.

(56) References Cited

U.S. PATENT DOCUMENTS

| 6,452,692 | B1 * | 9/2002 | Yacoub | G06F 3/1204 358/1.13 |
| 6,704,119 | B1 * | 3/2004 | Suzuki | G06F 17/30011 358/1.15 |
| 6,823,367 | B1 * | 11/2004 | Wakasugi | G06Q 30/06 358/402 |
| 7,460,692 | B2 * | 12/2008 | Mizutani | G06K 9/00255 358/1.14 |
| 2002/0116508 | A1 * | 8/2002 | Khan | H04L 51/24 709/229 |
| 2003/0187939 | A1 * | 10/2003 | O'Brien | H04L 51/18 709/206 |
| 2004/0073684 | A1 * | 4/2004 | Jodra | H04N 1/00244 709/228 |
| 2005/0041263 | A1 * | 2/2005 | Ishikawa | H04N 1/00846 358/1.14 |
| 2006/0092455 | A1 * | 5/2006 | Maeda | H04N 1/00204 358/1.15 |
| 2006/0158681 | A1 * | 7/2006 | Yorimoto | H04N 1/00278 358/1.15 |
| 2007/0002365 | A1 * | 1/2007 | Pesar | G06F 3/1207 358/1.15 |

(Continued)

FOREIGN PATENT DOCUMENTS

JP    2007-228409 A    9/2007

*Primary Examiner* — Beniyam Menberu
(74) *Attorney, Agent, or Firm* — Sughrue Mion, PLLC

(57) ABSTRACT

A system includes
an output unit that outputs document data transmitted from a sender,
a recipient information creating unit that creates recipient information related to a recipient who outputs the document data using the output unit, after the document data is output by the output unit, and
a transmitting unit that transmits the recipient information to the sender.

11 Claims, 11 Drawing Sheets

(56) References Cited

U.S. PATENT DOCUMENTS

| | | | |
|---|---|---|---|
| 2009/0287806 A1* | 11/2009 | Hamilton, II | G06F 3/1219 |
| | | | 709/223 |
| 2011/0075195 A1* | 3/2011 | Cain | G06F 3/1205 |
| | | | 358/1.15 |
| 2013/0208299 A1* | 8/2013 | Doui | G06K 15/4095 |
| | | | 358/1.14 |
| 2015/0180967 A1* | 6/2015 | Takagishi | H04M 1/72561 |
| | | | 709/204 |

\* cited by examiner

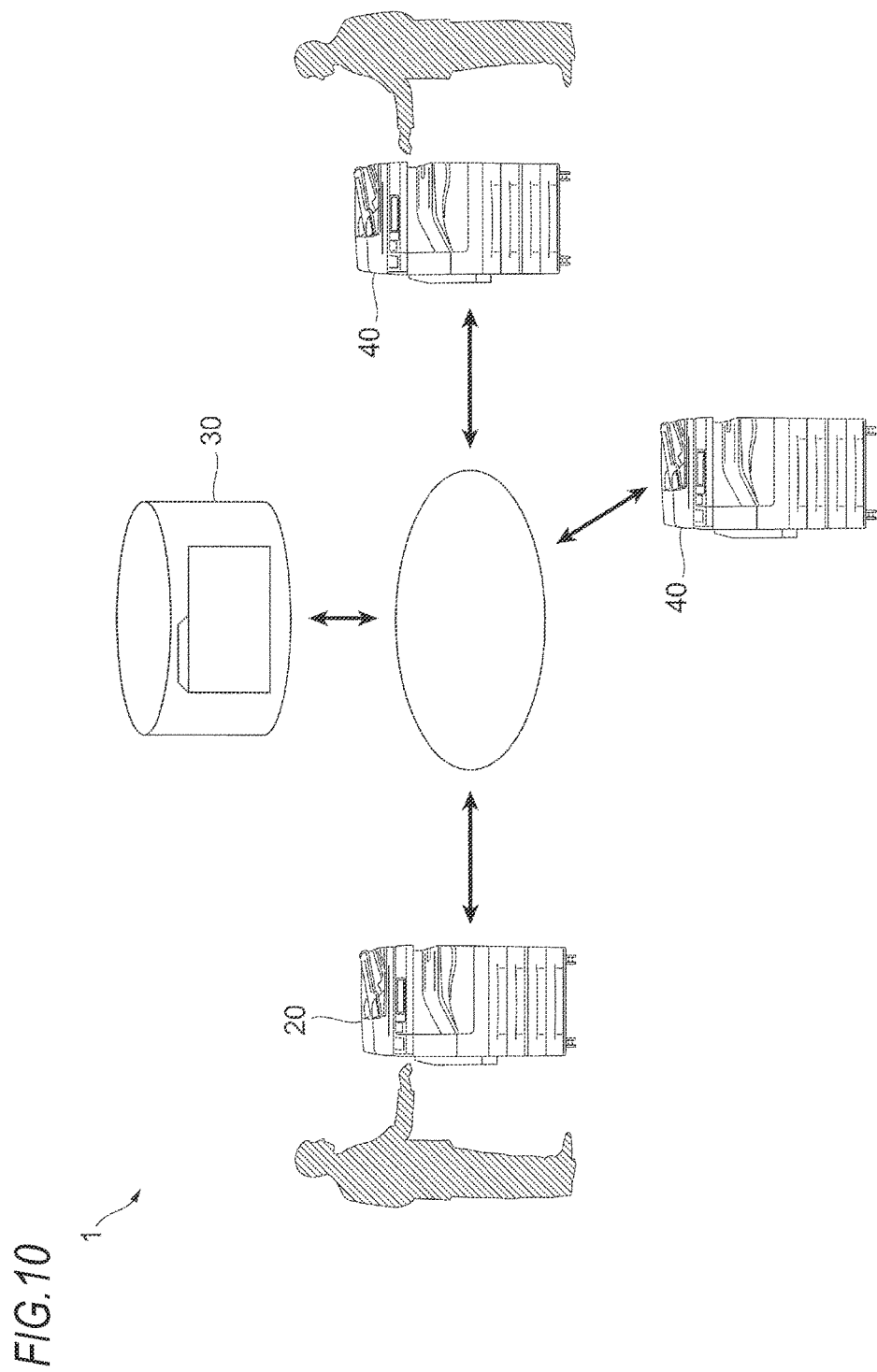

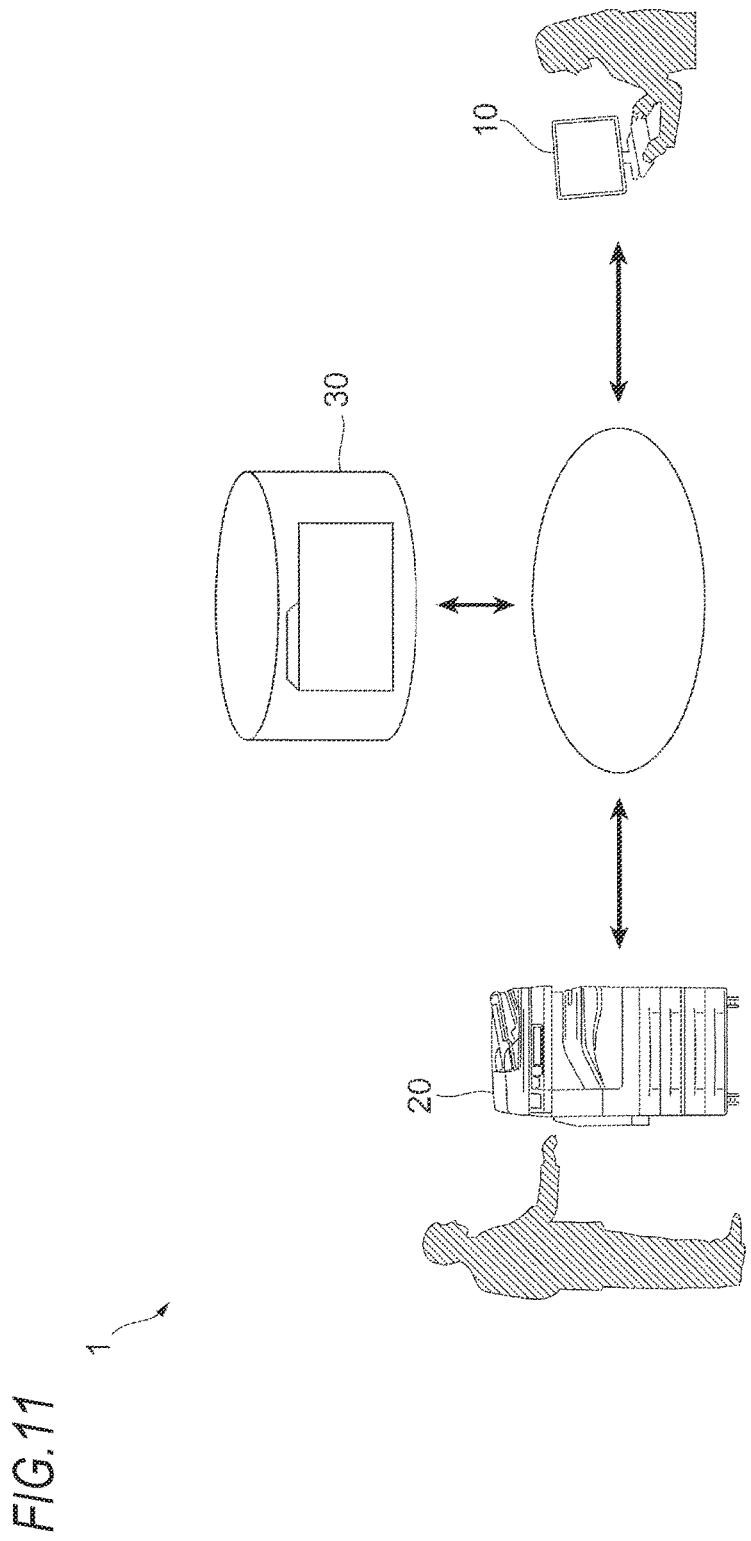

SYSTEM, OUTPUT APPARATUS, AND SERVER DEVICE

CROSS-REFERENCE TO RELATED APPLICATIONS

This application is based on and claims priority under 35 USC 119 from Japanese Patent Application No. 2016-146827 filed Jul. 26, 2016.

BACKGROUND

Technical Field

The present invention relates to a system, an output apparatus, and a server device.

SUMMARY

According to an aspect of the invention, a system includes
an output unit that outputs document data transmitted from a sender,
a recipient information creating unit that creates recipient information related to a recipient who outputs the document data using the output unit, after the document data is output by the output unit, and
a transmitting unit that transmits the recipient information to the sender.

BRIEF DESCRIPTION OF THE DRAWINGS

Exemplary embodiments of the present invention will be described in detail based on the following figures, wherein:

FIG. 10 is a view illustrating an exemplary configuration of a document transmitting/receiving system of an exemplary embodiment 2; and FIG. 11 is a view illustrating an exemplary configuration of a document transmitting/receiving system of an exemplary embodiment 3.

DETAILED DESCRIPTION

Hereinafter, exemplary embodiments of the present invention will be described with reference to the accompanying drawings.

Exemplary Embodiment 1

[System Configuration]

Figure 1:
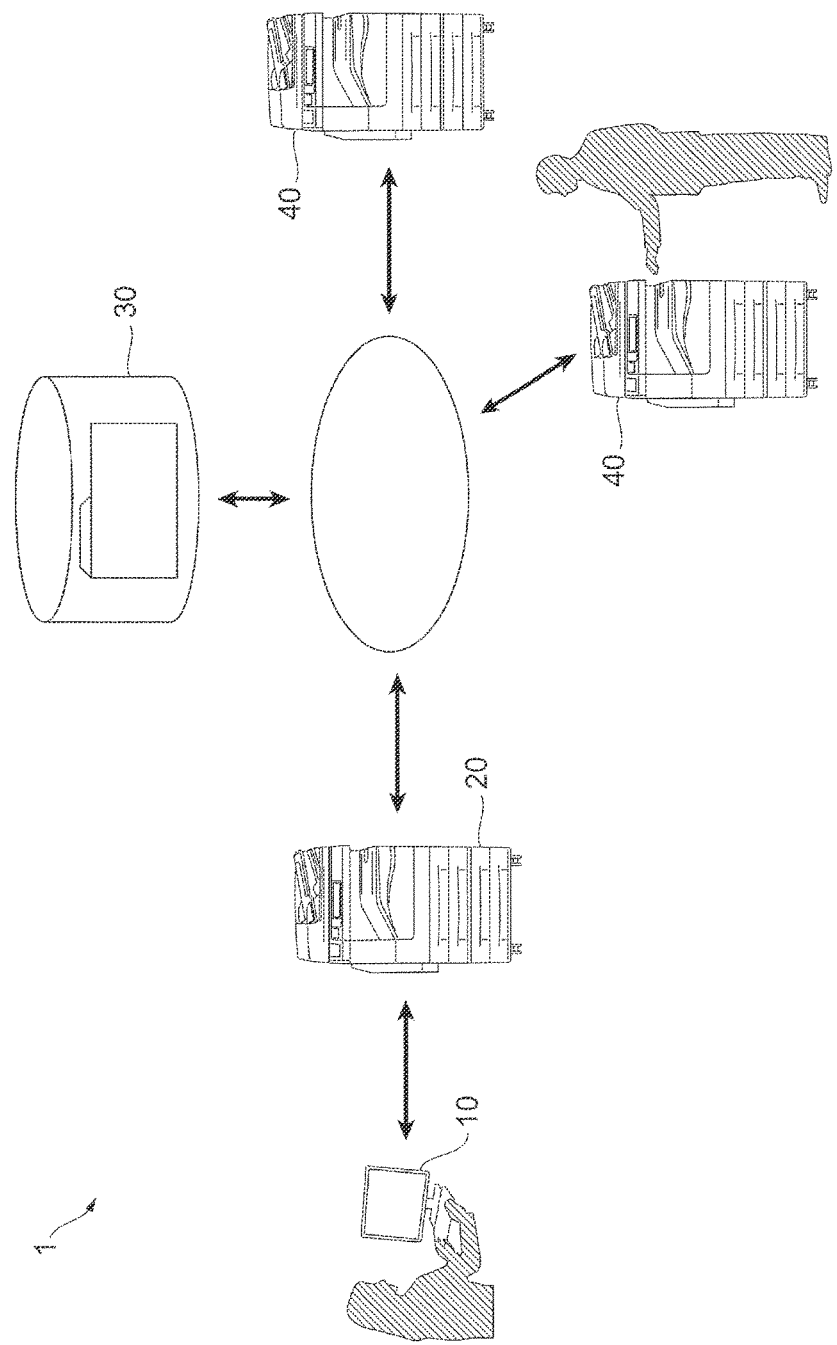
FIG. 1 is a view illustrating an exemplary configuration of a document transmitting/receiving system to which an exemplary embodiment 1 is applied.

FIG. 1 is a view illustrating an exemplary configuration of a document transmitting/receiving system to which an exemplary embodiment 1 is applied.

As illustrated in FIG. 1, a document transmitting/receiving system 1 of the exemplary embodiment 1 includes a terminal device 10, a first image processing apparatus 20, a management server 30, and plural second image processing apparatuses 40. The terminal device 10, the first image processing apparatus 20, the management server 30, and the second image processing apparatuses 40 are data-connected to each other directly or through a network.

In the document transmitting/receiving system 1 of the exemplary embodiment 1, a sender transmits a document from the first image processing apparatus 20 to one of the second image processing apparatuses 40 through the terminal device 10. Specifically, the sender first creates a document by using the terminal device 10. The created document is transmitted from the first image processing apparatus 20 to the second image processing apparatus 40 via the management server 30. Then, the document is printed on paper in the second image processing apparatus 40 and received by a recipient.

As described above, in the document transmitting/receiving system 1 of the exemplary embodiment 1, the first image processing apparatus 20 functions like a mailbox in which a sender puts a mail, and the second image processing apparatus 40 functions like a mailbox at which a recipient receives the mail. In addition, the document transmitting/receiving system 1 implements an electronic postal service (hereinafter, referred to as the "present service") of transmitting and receiving a document through the plural image processing apparatuses. In the present service, a recipient may receive a document from any of the plural second image processing apparatuses 40 installed at any places.

In addition, in the document transmitting/receiving system 1 of the exemplary embodiment 1, when a sender sends a document to a recipient, the sender may obtain a delivery certification certifying that the recipient has printed the document.

The delivery certification will be described in detail later.

In addition, in the exemplary embodiment 1, the second image processing apparatus 40 functions as an example of an output unit (an output section or an output apparatus) and an example of a recipient information creating unit (a recipient information creating section), and the management server 30 functions as an example of a transmitting unit (a transmitting section). Further, the management server 30 also functions as a recipient information receiving unit.

In the exemplary embodiment 1, a document refers to a document written with information that may be recognized by a perception of a person such as characters, signs, and images. In addition, document data includes letter data that becomes a letter when the letter data is printed on paper. Here, the letter refers to a document presenting a sender's will or notifying a fact to a specific recipient.

Examples of the letter may include an official letter, an invoice, a seal registration certificate, a copy of a resident's card, and a direct mail written with a recipient's name. Examples of documents other than the letter may include a catalog and a direct mail written with no recipient's name.

In addition, the document created by the sender is kept the same in contents but a data format thereof changes until the recipient receives the document. In the descriptions hereinafter, for convenience of descriptions, a document as electronic data may be generally referred to as "document data," regardless of the data format of the document. In addition, a printout which is obtained by printing the document data on paper or the like will be referred to as a "paper printing document."

At this time, the first image processing apparatus 20 and the second image processing apparatus 40 are identical to each other in basic configuration. In the descriptions hereinafter, the first image processing apparatus 20 is a machine used when a sender sends a document (hereinafter, referred to as a "sender side machine"). Meanwhile, the second image processing apparatus 40 is a machine used when a recipient receives a document (hereinafter, referred to as a "recipient side machine").

Here, the second image processing apparatus 40 may be the sender side machine, and the first image processing apparatus 20 may be the recipient side machine. However, when all the cases where any one of the first image processing apparatus 20 and the second image processing apparatus 40 is the sender side machine, and the other is the recipient side machine are described, the functional configurations will overlap with each other thereby causing descriptions of the functional configurations to be complicated. Hence, descriptions will be made assuming that the first image processing apparatus 20 is the sender side machine, and the second image processing apparatus 40 is the recipient side machine.

The terminal device 10 creates the document data with a predetermined application or the like through an operation by the sender. The terminal device 10 sends the created document data to the first image processing apparatus 20. As the terminal device 10, for example, an installed personal computer (PC) or a portable terminal such as a mobile phone or a tablet terminal may be used.

The first image processing apparatus 20 is a so-called multifunction machine and has image processing functions such as copying, printing (image forming), image reading, and faxing. Further, the first image processing apparatus 20 has a function to transmit the document data created by the sender and relevant information related to the transmission of the document data to the management server 30, as one of the functions to implement the present service.

The management server 30 stores the document data and the relevant information related to the transmission/reception of the document data which are acquired from the first image processing apparatus 20. Then, the management server 30 transmits the stored document data to the second image processing apparatus 40 based on an instruction from the recipient.

The second image processing apparatus 40 is a so-called multifunction machine and has image processing functions such as copying, printing, image reading, and faxing. Further, the second image processing apparatus 40 prints the document data received from the management server 30, as one of the functions to implement the present service.

[Exemplary Hardware Configuration]

Figure 2:
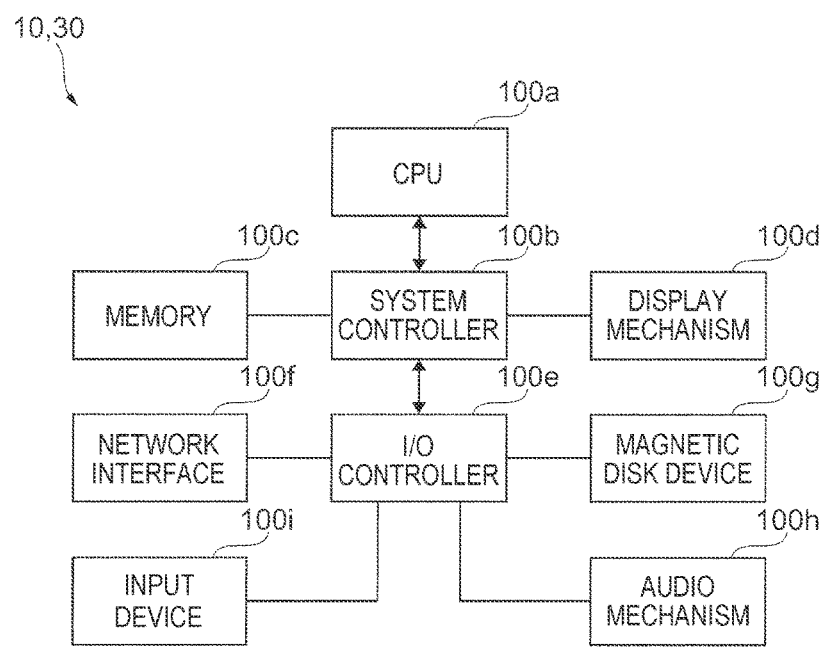
FIG. 2 is a view illustrating an exemplary hardware configuration of a terminal device and a management server.

FIG. 2 is a view illustrating an exemplary hardware configuration of the terminal device 10 and the management server 30.

As illustrated in FIG. 2, each of the terminal device 10 and the management server 30 includes a central processing unit (CPU) 100*a* as an arithmetic operation unit and a memory 100*c* as a main memory. Further, each of the terminal device 10 and the management server 30 includes, for example, a magnetic disk device (hard disk drive (HDD)) 100*g*, a network interface 100*f*, a display mechanism 100*d*, an audio mechanism 100*h*, and an input device 100*i* such as a keyboard or a mouse, as external devices.

The memory 100*c* and the display mechanism 100*d* are connected to the CPU 100*a* through a system controller 100*b*. In addition, the network interface 100*f*, the magnetic disk device 100*g*, the audio mechanism 100*h*, and the input device 100*i* are connected to the system controller 100*b* through an I/O controller 100*e*. The components are connected to each other by various buses such as a system bus or an input/out bus.

The magnetic disk device 100*g* stores a program to implement each of the functions. The program is loaded to the memory 100*c*, and processing based on the program is performed by the CPU 100*a* so that the various functions are implemented.

[Hardware Configuration of First Image Processing Apparatus 20 and Second Image Processing Apparatus 40]

Figure 3:
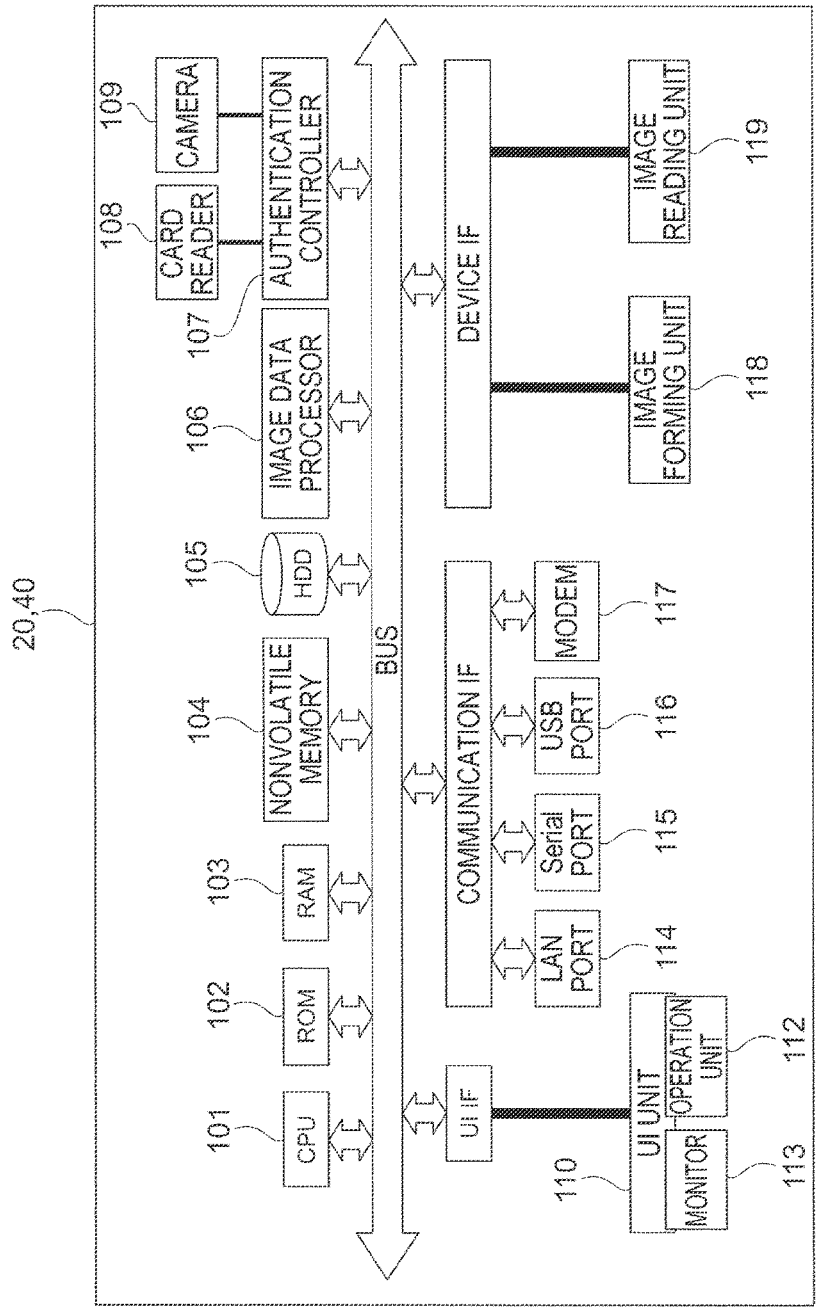
FIG. 3 is a view illustrating an exemplary hardware configuration of a first image processing apparatus and a second image processing apparatus.

FIG. 3 is a view illustrating an exemplary hardware configuration of the first image processing apparatus 20 and the second image processing apparatus 40.

As illustrated in FIG. 3, a CPU 101 performs a main control of the first image processing apparatus 20 and the second image processing apparatus 40, by loading various programs stored in, for example, a read only memory (ROM) 102 to a random access memory (RAM) 103 and executing the programs, so as to implement the functions of each of the first image processing apparatus 20 and the second image processing apparatus 40. The ROM 102 is a memory that stores, for example, various programs to be executed by the CPU 101 or predetermined fixed data. The RAM 103 is a memory that is used as, for example, a working memory for the CPU 101. A nonvolatile memory 104 is a memory that may hold the stored information even when a power is not supplied, and stores parameters or various history data to be used for an image adjustment.

The HDD 105 is, for example, a magnetic disk device and stores, for example, image data read by an image reading unit 119 or image data to be used for an image formation in an image forming unit 118 to be described later.

An image data processor 106 performs processing for image data such as decompression/compression of image data. An authentication controller 107 controls a card reader 108 and a camera 109. The card reader 108 reads an IC card equipped with an integrated circuit (IC) therein for recording information or performing an arithmetic operation, so as to acquire information recorded in the IC card. The camera 109 (an example of a capturing unit) captures an image including a user operating a user interface (UI) unit 110.

The UI unit 110 includes an operation unit 112 that receives a contact operation by a user and a monitor 113 that displays various images.

The operation unit 112 receives an instruction from a user for image processing functions of each of the first image processing apparatus 20 and the second image processing apparatus 40 such as a printing function, a scanning function, a copying function, a facsimile function, and a document transmitting/receiving function.

A local area network port (LAN) port 114 is an interface for inputting and outputting data with respect to the outside. In the exemplary embodiment 1, the LAN port 114 also functions as a wireless communication interface. A serial port 115 is an interface for a connection of an external peripheral device. A universal serial bus (USB) port 116 is an interface for a connection of a peripheral device through a USB cable. A modem 117 is a controller to be connected to a public line, such as a facsimile, and enables providing various facsimile functions.

The image forming unit 118 forms an image on paper or the like as an example of a recording medium. The image reading unit 119 reads the image recorded on the paper or the like.

Subsequently, the functional configurations of the respective components related to the document transmitting/receiving system 1 will be described in detail.

[Functional Configuration of Terminal Device 10]

In the exemplary embodiment 1, the terminal device 10 is connected to the first image processing apparatus 20. A printer driver is installed in the terminal device 10 to operate the first image processing apparatus 20. The terminal device 10 is configured to enable operating the image forming unit 118 or the image reading unit 119 in the first image processing apparatus 20 or using the present service through the first image processing apparatus 20.

In addition, in the terminal device 10, a sender creates a document file by using, for example, a predetermined application. The document file is data serving as the base for a paper printing document which is to be finally sent to a recipient. Then, the terminal device 10 converts the document file created by the sender into page-description language (PDL) data. In addition, the terminal device 10 transmits the PDL data to the first image processing apparatus 20.

[Functional Configuration of First Image Processing Apparatus 20]

Figure 4:
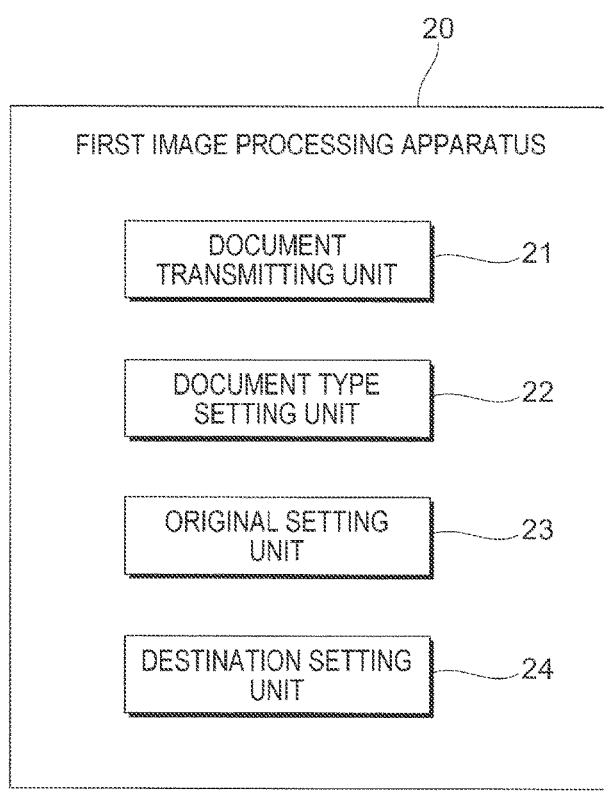
FIG. 4 is a functional block diagram of the first image processing apparatus of the exemplary embodiment 1.

FIG. 4 is a functional block diagram of the first image processing apparatus 20 of the exemplary embodiment 1.

As illustrated in FIG. 4, the first image processing apparatus 20 includes a document transmitting unit 21 that transmits a document image, a document type setting unit 22 that sets a type of a document, an original setting unit 23 that assures the originality, and a destination setting unit 24 that sets a destination to which document data is to be transmitted.

The document transmitting unit 21 creates a document image (an image file) based on the PDL data of the document acquired from the terminal device 10. Then, the document transmitting unit 21 transmits the created document image to the management server 30.

The document type setting unit 22 sets transmission/reception types of the document. In the exemplary embodiment 1, the transmission/reception types include "ordinary transmission/reception," "time-limited transmission/reception," and "delivery certification transmission/reception." The "ordinary transmission/reception" is ordinary transmission/reception other than the time-limited transmission/reception and the delivery certification transmission/reception. The "time-limited transmission/reception" is transmission/reception for which an expiration period is set in which a recipient is permitted to print the document image in the ordinary format. The "delivery certification transmission/reception" is transmission/reception that certifies that the document image has been printed or certifies a recipient who has printed the document image.

Here, the transmission/reception types may be combined with each other. That is, document data whose a transmission/reception type of a document is the time-limited transmission/reception and the delivery certification transmission/reception may be transmitted.

The original setting unit 23 performs an original setting for a paper printing document to assure that the paper printing document is the original. When receiving an instruction from the sender to perform the original setting for a paper printing document, the original setting unit 23 transmits original setting information which is instruction information for the original setting, to the management server 30.

The destination setting unit 24 sets destination information which is information of the recipient of the document. Then, the destination setting unit 24 transmits the destination information in association with the document image, to the management server 30.

At this time, the destination of the document image is not limited to a specific individual, and a company or a specific department of a company may be set as a destination. In addition, the destination setting unit 24 may directly select the recipient side machine by using information that may designate a specific image processing apparatus connected to a network, and transmit the document image to the recipient side machine as a destination.

Subsequently, descriptions will be made on a send screen displayed on the display mechanism 100*d* (an example of a receiving unit) of the terminal device 10 when the sender uses the present service. Here, the send screen is displayed by a printer driver of the first image processing apparatus 20.

Figure 5A:
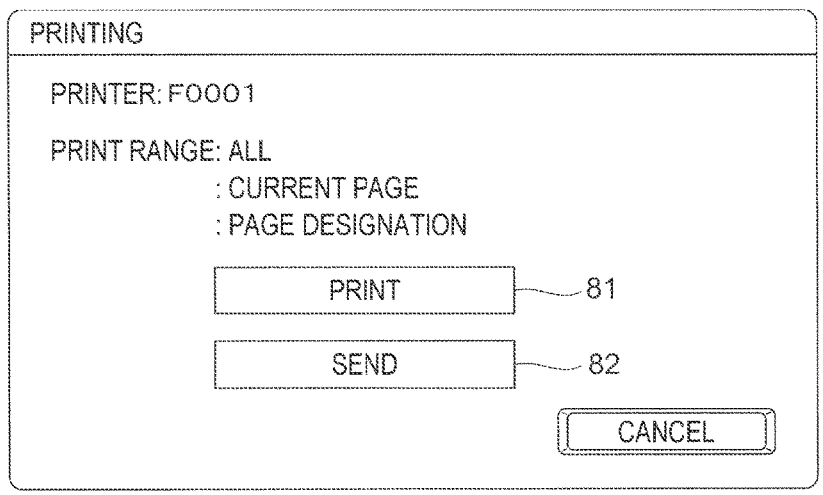
FIGS. 5A and 5B are views of an exemplary document send screen of the exemplary embodiment 1.
Figure 5B:
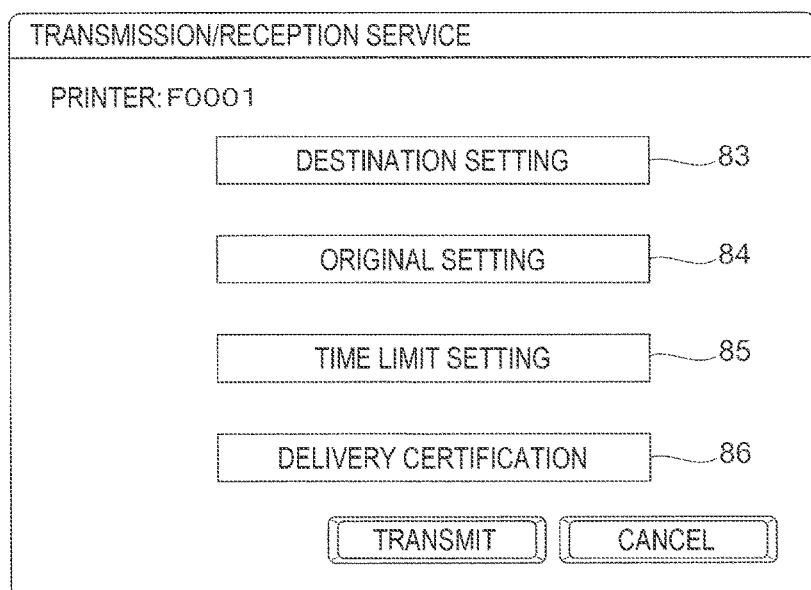

FIGS. 5A and 5B are views of an example of the document send screen of the exemplary embodiment 1.

For example, a screen for performing printing in the first image processing apparatus 20 is opened from the menu of the application of the terminal device 10. Then, as illustrated in FIG. 5A, the screen displays a print button 81 and a send button 82. The print button 81 is a button for printing the document image in the first image processing apparatus 20. Meanwhile, the send button 82 is a button for sending the document to the recipient through the first image processing apparatus 20.

Then, when the send button 82 is selected, the send screen for sending the document is displayed as illustrated in FIG. 5B. The send screen includes a destination setting button 83 for setting a destination, an original setting button 84 for performing an original setting for a paper printing document, a time limit setting button 85 for setting the type of transmission/reception to the time-limited transmission/reception, and a delivery certification button 86 for setting the type of transmission/reception to the delivery certification transmission/reception.

The destination setting button 83 is used to set a recipient or a recipient side machine. When the destination setting button 83 is pressed, for example, a list of recipient names is displayed. Then, the sender designates a recipient name to which the document is to be transmitted. The designated recipient name information is transmitted to the first image processing apparatus 20 as destination information.

The original setting button 84 is used to perform an original setting for a paper printing document based on the transmitted document. When the original setting button 84 is pressed, original setting information for performing a setting to assure the originality of the paper printing document is transmitted to the first image processing apparatus 20.

The time limit setting button 85 is used to set a printing expiration period (hereinafter, referred to as a "printing time limit") for the document image. When the time limit setting button 85 is pressed, a predetermined input screen is displayed, and a setting of a printing time limit such as date/time is received from the sender. Then, the printing time limit setting information for setting the printing time limit is transmitted to the first image processing apparatus 20.

The delivery certification button 86 is used to perform a delivery certification setting for setting the type of the document transmission to the delivery certification transmission/reception. When the delivery certification button 86 is pressed, delivery certification setting information associated with the document image is transmitted to the first image processing apparatus 20. In the exemplary embodiment 1, a request for the delivery certification (creation of recipient information) from the sender is received by the delivery certification button 86.

Here, in the exemplary embodiment 1, when the delivery certification transmission/reception is set, an additional fee is charged to the sender. Then, in the exemplary embodiment 1, a screen for confirming the fee charge is also displayed at the time of performing the delivery certification setting.

[Functional Configuration of Management Server 30]

Figure 6:
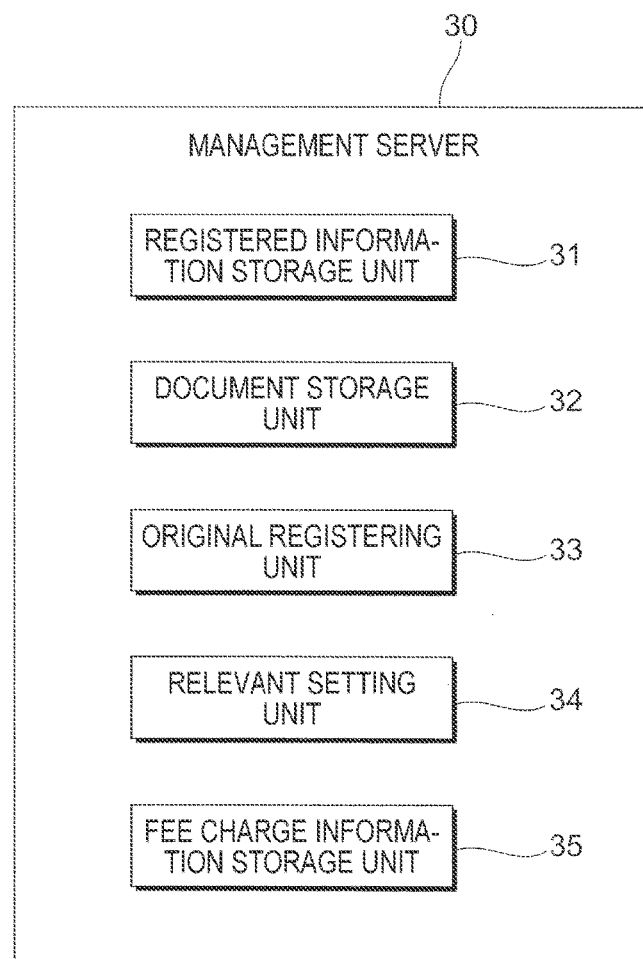
FIG. 6 is a functional block diagram of the management server of the exemplary embodiment 1.

FIG. 6 is a functional block diagram of the management server 30 of the exemplary embodiment 1.

As illustrated in FIG. 6, the management server 30 includes a registered information storage unit 31 that stores registered information for use of the present service, a document storage unit 32 that stores the document image, an original registering unit 33 (an example of an imparting unit) that registers the originality of a paper printing document, a relevant setting unit 34 that performs a setting related to the type of transmission/reception, and a fee charge information storage unit 35 that stores information of fee charge related to transmission/reception.

The registered information storage unit 31 stores registrant information such as a registered name of a user using the present service (e.g., a registered company name), a user ID, and a use password. The registered information storage unit 31 enables the stored registered information to be referred to when a recipient performs a log-in authentication in the second image processing apparatus 40.

The document storage unit 32 stores the document image received from the first image processing apparatus 20. In addition, the document storage unit 32 stores the destination information of the document in association with the document image. Then, the document storage unit 32 transmits the stored document image to the second image processing apparatus 40 according to a request from the second image processing apparatus 40.

The original registering unit 33 registers the original of the document image for which the original setting has been performed. In order to assure the originality of a paper printing document, the original registering unit 33 stores information that may identify the document image which is the base for a paper printing document and a paper printing document corresponding to the document image. The original registering unit 33 of the exemplary embodiment 1 creates an identification information image to identify that the paper printing document is the original. The identification information image is an image that may uniquely specify the paper printing document. The original registering unit 33 stores the document image and the identification information image in association with each other.

In addition, the original registering unit 33 stores a printing history which is a printing history of the document image in the second image processing apparatus 40. In the exemplary embodiment 1, when a certain document image is printed for the first time, the original registering unit 33 transmits the identification information image corresponding to the document image to the second image processing apparatus 40. At this time, when second or more printings of the document image are performed, the original registering unit 33 does not transmit the corresponding identification information image to the second image processing apparatus 40. That is, in the exemplary embodiment 1, the originality is assured only for the paper printing document which is printed for the first time.

In addition, in assuring the originality of the paper printing document, the identification information image may not be necessarily printed directly on the paper printing document. For example, when the document image is printed, a paper fingerprint of printing paper is read in advance. Then, the original registering unit 33 may store the information of the paper fingerprint in association with the document image so as to manage the originality of the paper printing document.

In addition, the number of the printing times of the paper printing document for assuring the originality is not limited to one time and may be a predetermined number of times.

When the printing time limit is set for the document image, the relevant setting unit 34 stores the printing time limit for the document image. The relevant setting unit 34 permits the document image for which the printing time limit has been set, to be printed before the printing time limit. Meanwhile, the relevant setting unit 34 restricts the document image for which the printing time limit has been set, from being printed after elapse of the printing time limit.

In addition, when the delivery certification is set for the document image, the relevant setting unit 34 notifies the second image processing apparatus 40 of the delivery certification transmission/reception set for the document image.

The fee charge information storage unit 35 stores information of fee charge to a sender or a recipient which arises from sending of a document by the sender or a reception of a document by the recipient.

For example, when the sender sends a document and the management server 30 receives a document image, the fee charge information storage unit 35 charges fee to the sender. In addition, when the sender sets the delivery certification or the printing time limit, the fee charge information storage unit 35 charges an additional fee to the sender.

When the document image is printed, the fee charge information storage unit 35 may charge a fee to the recipient.

[Functional Configuration of Second Image Processing Apparatus 40]

Figure 7:
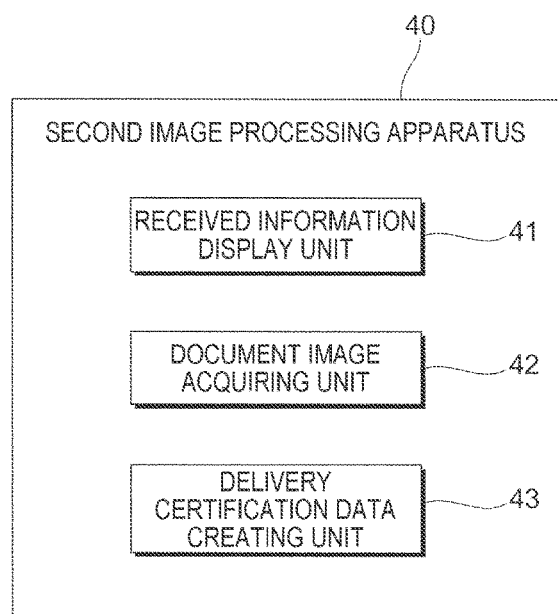
FIG. 7 is a functional block diagram of the second image processing apparatus of the exemplary embodiment 1.

FIG. 7 is a functional block diagram of the second image processing apparatus 40 of the exemplary embodiment 1.

As illustrated in FIG. 7, the second image processing apparatus 40 includes a received information display unit 41 that causes information about the document transmission/reception service to be displayed, a document image acquiring unit 42 that acquires the document image, and a delivery certification data creating unit 43 that creates delivery certification data.

The received information display unit 41 causes the UI unit 110 (an example of a display) to display various messages for the present service. For example, when there is a document image that has not been received, the received information display unit 41 displays a notification indicating the existence of the document image that has not been received, to the recipient who is logging in to the second image processing apparatus 40.

In addition, when the printing time limit is set for the document image, the received information display unit 41 causes the UI unit 110 to display the existence of the document image for which the printing time limit has been set. In addition, when the delivery certification is set for the document image, the received information display unit 41 causes the UI unit 110 to display the existence of the document image for which the delivery certification transmission/reception has been set.

The document image acquiring unit 42 acquires the document image that has been transmitted to the recipient who is logging in, from the management server 30. Then, the document image acquiring unit 42 causes the acquired image to be printed in the image forming unit 118.

When the delivery certification is set for the document image, the delivery certification data creating unit 43 creates delivery certification data. The delivery certification data is data that certifies that the document image has been printed by the recipient. The delivery certification data creating unit 43 creates the delivery certification data after the recipient prints the document image for which the delivery certification has been set. The contents of the delivery certification data include, for example, recipient information related to the recipient, printing information related to the printing of the document image, and printed document information related to the document image. Then, the delivery certification data creating unit 43 transmits the created delivery certification data to the management server 30.

Subsequently, the delivery certification data created by the delivery certification data creating unit 43 will be specifically described.

Figure 8:
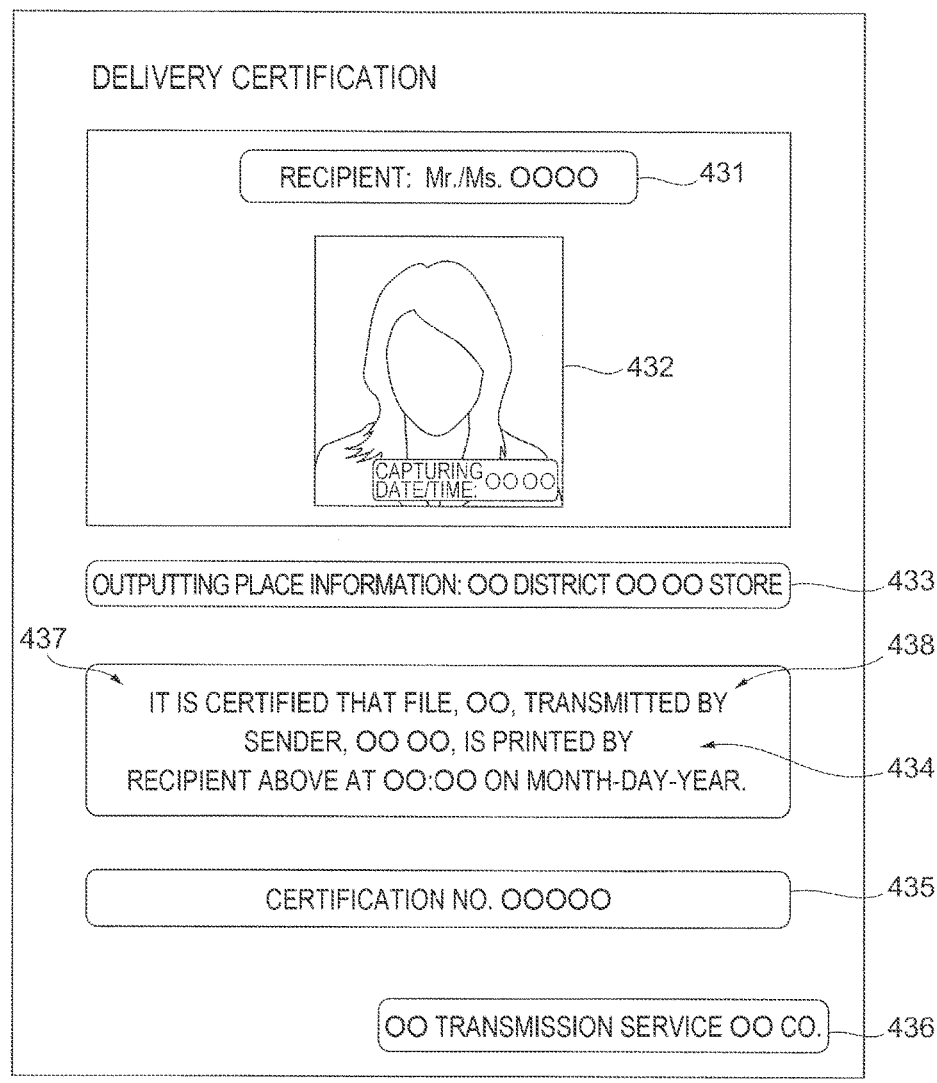
FIG. 8 is an example of delivery certification data created by a delivery certification data creating unit.

FIG. 8 is an example of the delivery certification data created by the delivery certification data creating unit 43.

As illustrated in FIG. 8, the delivery certification data is an example of the recipient information and includes a recipient name display 431 that displays a name of the recipient, a recipient display 432 that displays a face image of the recipient, and outputting place information 433 that displays a place where the document image has been printed.

The recipient name display 431 is specified based on the login performed by the recipient to receive the document from the second image processing apparatus 40.

The recipient display 432 is an image captured by the camera 109 of the second image processing apparatus 40 when the recipient performs the printing of the document image for which the delivery certification has been set. Further, the recipient display 432 displays capturing date/time when the capturing is performed.

The outputting place information 433 is specified by, for example, an address of a building where the second image processing apparatus 40 to which the recipient is logging in is set.

Further, the delivery certification data is an example of the printing information and includes printing date/time information 434 that displays date/time when the paper printing document is printed, a certification number 435 that is uniquely imparted to a delivery certificate, and provider information 436 that displays a service provider.

The printing date/time information 434 indicates date/time when the printing of a paper printing document is completed. In addition, the printing date/time information 434 may indicate, for example, date/time when the recipient logs in or logs out in the second image processing apparatus 40.

The certification number 435 is a number added to the delivery certificate. The certification number 435 is transmitted to the management server 30 after the delivery certification data is created.

The service provider information 436 explicitly indicates a name of a service provider issuing a delivery certificate, in addition to providing the printing service of a document image.

Further, the delivery certification data is an example of the printed document information and includes a sender name display 437 that displays a name of the sender and document specifying information 438 that is information of the target document for the delivery certification.

The sender name display 437 is specified based on the information when the sender logs in to use the present service.

The document specifying information 438 is information that may specify the document image sent by the sender. In the exemplary embodiment 1, the document specifying information 438 is a document file name created by the sender. At this time, the document specifying information 438 may be information that may specify the document image stored in the management server 30, or a part or a reduced image of the document image.

[Exemplary Operation of Document Transmitting/Receiving System 1]

Subsequently, an exemplary operation of the document transmitting/receiving system 1 of the exemplary embodiment 1 will be described. In the example described below, the sender uses the first image processing apparatus 20 installed in, for example, an office as the sender side machine. The recipient uses the second image processing apparatus 40 installed in, for example, a convenience store as the recipient side machine. The type of document transmission/reception is the delivery certification transmission/reception. Further, the original setting has been performed for a paper printing document.

Figure 9:
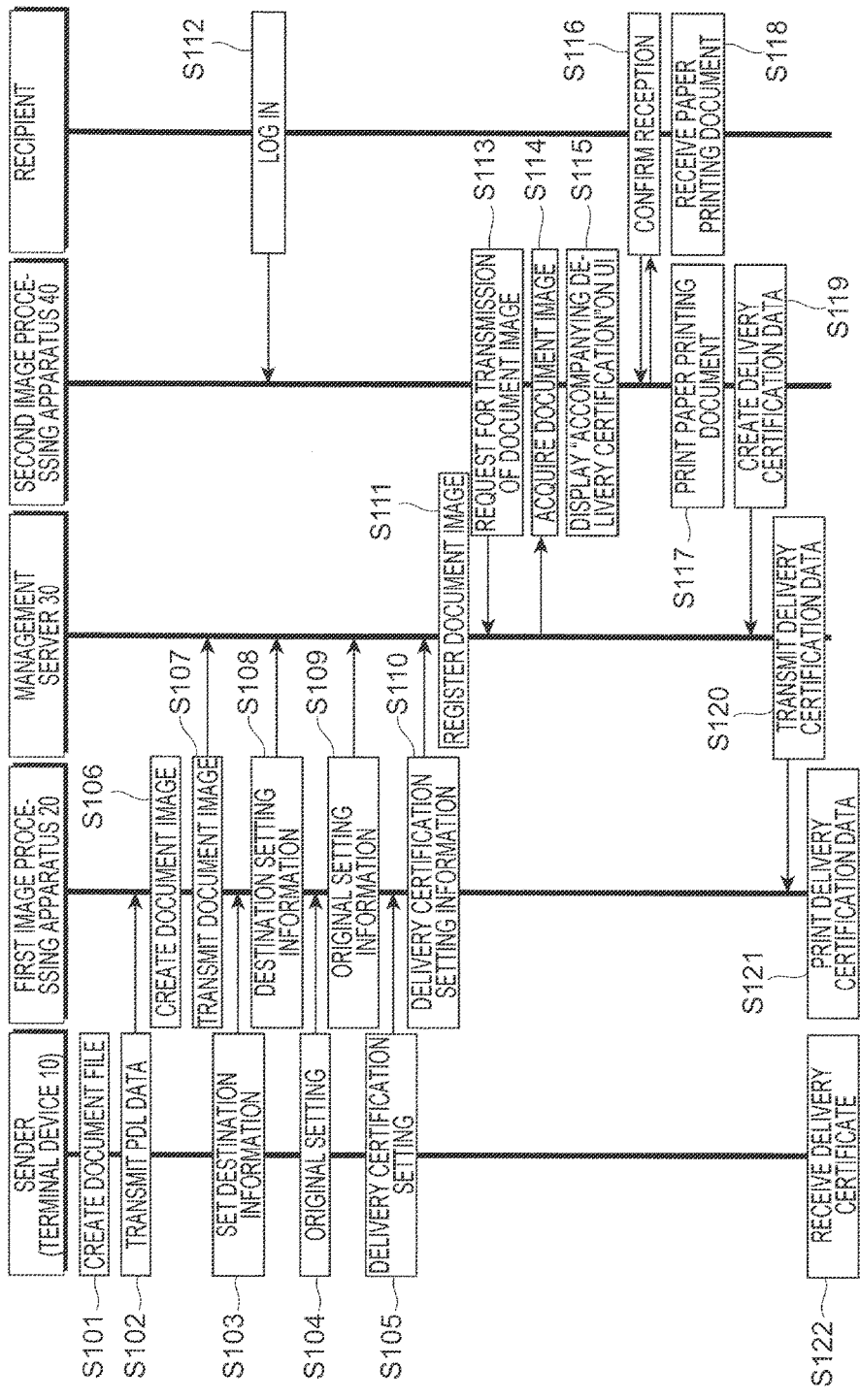
FIG. 9 is a sequence chart of the document transmitting/receiving system of the exemplary embodiment 1.

FIG. 9 is a sequence chart of the document transmitting/receiving system 1 of the exemplary embodiment 1.

As illustrated in FIG. 9, the sender creates the document file such as a letter in the terminal device 10 (step (hereinafter, referred to as "S") 101). Then, the sender operates the send screen (see FIGS. 5A and 5B) displayed on the display mechanism 110d of the terminal device 10 to send the document to the recipient. Then, the terminal device 10 creates PDL data of the document file and transmits the PDL data to the first image processing apparatus 20 (S102).

In addition, in the sending operation, the sender designates a specific recipient by setting destination information of the document file (S103). Then, the sender performs the original setting for a paper printing document (S104). In addition, the sender performs the delivery certification setting (S105).

Then, the first image processing apparatus 20 creates a document image based on the acquired PDL data (S106). In addition, the first image processing apparatus 20 transmits the document image to the management server 30 (S107).

In addition, the first image processing apparatus 20 transmits the destination setting information to the management server 30 (S108). Then, the first image processing apparatus 20 transmits the original setting information to the management server 30 (S109). Further, the first image processing apparatus 20 transmits the delivery certification setting information to the management server 30 (S110).

Then, the management server 30 registers the document image (S111). In registering the document image, for example, storing the document image, designating the destination for the stored document image, registering an identification information image, and registering the delivery certification transmission/reception are performed. In addition, in registering the document image, a printing time limit is registered when the printing time limit is set for the document image.

Meanwhile, the recipient logs in to the second image processing apparatus 40 installed in, for example, the convenience store (S112). In the exemplary embodiment 1, the face of the recipient is captured by the camera 109 when the recipient logs in.

The second image processing apparatus 40 requests the management server 30 to transmit the document image that has been transmitted to the recipient who logs in (S113). Then, the second image processing apparatus 40 acquires the document image from the management server 30 (S114). Here, when there is a document image for which the delivery certification has been set among the document images acquired from the management server 30, the UI unit 110 displays the existence of the document image for which the delivery certification has been set, like "Accompanying Delivery Certification" (S115).

The second image processing apparatus 40 confirms, from the recipient, the reception of the document image for which the delivery certification has been set (S116). The reception confirmation confirms the recipient's will to receive the document image for which the delivery certification has been set. Then, when the reception is confirmed from the recipient in S116, the second image processing apparatus 40 prints a paper printing document based on the document image (S117). Then, the recipient receives the paper printing document (S118).

After the document image is printed, the second image processing apparatus 40 creates the delivery certification data (see FIG. 8) and sends the delivery certification data to the management server 30 (S119). The delivery certification data includes information such as a name and a face image of the recipient, and printing date/time of the document image. Here, in the exemplary embodiment 1, the delivery certification data includes the face image of the recipient captured at the log in time in S112. However, the recipient's face may be captured when the will for the reception is confirmed in S116.

Then, the management server 30 transmits the received delivery certification data to the first image processing apparatus 20 (S120). In addition, the first image processing apparatus 20 prints the received delivery certification data (S121). Then, the sender receives the delivery certificate (S122).

In the exemplary embodiment 1, the additional fee for the delivery certification is charged to the sender at the timing when the delivery certification data is transmitted to the sender.

In the exemplary embodiment 1, only when the delivery certification has been set, the delivery certification data is created and transmitted after the printing of the printing document for which the delivery certification has been set. That is, even though the sender sends the document file to the recipient, unless the delivery certification has been set, the delivery certification data for the paper printing document is not created.

In addition, the identification information image for assuring the originality is printed on the paper printing document that is printed by the recipient. At this time, the recipient may print the document image for which the delivery certification has been set, plural times. However, in the exemplary embodiment 1, after the document image for which the delivery certification has been set is printed for the first time, the identification information image for assuring the originality is not printed even when the same document image is printed again. In addition, in the exemplary embodiment 1, the delivery certification data is not created and transmitted for the second or more printings of the document image for which the delivery certification has been set.

In the exemplary embodiment 1, as an example of the recipient information, the recipient's face image captured by the camera 109 is used. However, the present invention is not limited thereto. For example, when recipient's biometric information such as a fingerprint or a vein of the hand is used for the log in authentication in the second image processing apparatus 40, the biometric information may be used as the recipient information.

Exemplary Embodiment 2

Subsequently, a document transmitting/receiving system 1 of an exemplary embodiment 2 will be described. In the exemplary embodiment 2, the same components as those in the exemplary embodiment 1 will be denoted by the same reference numerals as used in the exemplary embodiment 1, and detailed descriptions thereof will be omitted.

FIG. 10 is a view illustrating an exemplary configuration of the document transmitting/receiving system 1 of the exemplary embodiment 2.

As illustrated in FIG. 10, the document transmitting/receiving system 1 includes the first image processing apparatus 20, the management server 30 (an example of the transmitting unit), and the plural second image processing apparatuses 40 (an example of the output unit and the recipient information creating unit). In the exemplary embodiment 2, the sender side machine is the first image processing apparatus 20, and the recipient side machine is the second image processing apparatuses 40.

In the exemplary embodiment 2, it is assumed that the first image processing apparatus 20 is directly operated without the terminal device 10 which is used in the exemplary embodiment 1. For example, a case where the first image processing apparatus 20 is installed in, for example, a convenience store may be taken into account.

A sender transmits a document image to a recipient by directly operating the first image processing apparatus 20. Specifically, the sender causes a document to be read by the image reading unit 119 of the first image processing apparatus 20 or a document file recorded in a recording medium to be read by the first image processing apparatus 20. Thereafter, the document transmitting unit 21 of the first image processing apparatus 20 creates a document image of the read image or the acquired document file and transmits the document image to the management server 30.

In the exemplary embodiment 2, the send screen (see FIG. 5B) is displayed on the UI unit 110 of the first image processing apparatus 20. Then, the sender sets a recipient, an original, a delivery certification, or a printing time limit of the document on the screen of the UI unit 110.

In this way, in the document transmitting/receiving system 1 of the exemplary embodiment 2, the document data is transmitted from the first image processing apparatus 20 to the management server 30. Thereafter, the recipient receives and prints the document image in, for example, the second image processing apparatus 40 so that the paper printing document is received by the recipient.

When the delivery certification has been set for the document image, the delivery certification data is created in the second image processing apparatus 40, and the created delivery certification data is transmitted to the first image processing apparatus 20.

Exemplary Embodiment 3

Subsequently, a document transmitting/receiving system 1 of an exemplary embodiment 3 will be described. In the exemplary embodiment 3, the same components as those in the exemplary embodiment 1 will be denoted by the same reference numerals as used in the exemplary embodiment 1, and detailed descriptions thereof will be omitted.

FIG. 11 is a view illustrating an exemplary configuration of the document transmitting/receiving system 1 of the exemplary embodiment 3.

As illustrated in FIG. 11, the document transmitting/receiving system 1 includes the first image processing apparatus 20, the management server 30 (an example of the transmitting unit), the terminal device 10 (an example of the output unit and the recipient information creating unit). In the exemplary embodiment 3, the sender side machine is the first image processing apparatus 20, and the recipient side machine is the terminal device 10.

In the exemplary embodiment 3, the sender transmits a document to a recipient by directly operating the first image processing apparatus 20 as in the exemplary embodiment 2.

Meanwhile, the recipient logs in for the present service from the terminal device 10. Then, the terminal device 10 downloads the document image from the management server 30 and outputs the document image as an electronic file such as a portable document format (PDF).

In this way, in the document transmitting/receiving system 1 of the exemplary embodiment 3, the document image is transmitted from the first image processing apparatus 20 to the management server 30. Thereafter, the recipient outputs the document image in, for example, the terminal device 10 so that the electronic file of the document image is received by the recipient.

When the delivery certification has been set for the document image, the delivery certification data is created in the management server 30, and the created delivery certification data is transmitted to the first image processing apparatus 20.

In the exemplary embodiments 1 to 3, the configurations of the functional units to implement the transmission/reception service in the terminal device 10, the first image processing apparatus 20, the management server 30, and the second image processing apparatus 40 are not limited to the above-described aspects of the exemplary embodiments. For example, the management server 30 may not store the document image, and the second image processing apparatus 40 may acquire the document image or the PDL data stored in the first image processing apparatus 20 according to necessity.

In the exemplary embodiments 1 to 3, the management server 30 is caused to transmit the document image of the document file. However, instead of the document image, PDL data of the document file may be transmitted.

A program which causes a computer to implement the functions of the respective components in the present exemplary embodiments may be provided, for example, by a communication unit or in a state of being stored in various recording media.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
one or more hardware processors configured to implement:
an output unit that outputs document data transmitted from a sender;
a recipient information creating unit that creates recipient information related to a recipient who outputs the document data using the output unit, after the document data is output by the output unit;
a transmitting unit that transmits the recipient information to the sender;
a first image processing apparatus, comprising a first of the hardware processors, configured to receive the document data from the sender, the document data comprising a created document image and setting information; and
a server, comprising a second of the hardware processors, configured to receive the document data from the first image processing apparatus and to transmit the document image to a second image processing apparatus in response to a request for the document image from the second image processing apparatus,
wherein the recipient instructs an output of the document data to occur at a place,
wherein the recipient information indicates the place,
wherein the second image processing apparatus, comprising a third of the hardware processors and the recipient information creating unit, configured to request the document image from the server, to print the document image on paper in response to an instruction from the recipient and to transmit the recipient information to the server, and
wherein the first image processing apparatus is configured to print on paper.

2. The system according to claim 1, wherein
the output unit includes a capturing unit that is capable of capturing the recipient who operates the output unit, and
the recipient information creating unit includes an image of the recipient captured by the capturing unit in the recipient information.

3. The system according to claim 1, wherein the one or more hardware processors are further configured to implement:
a receiving unit that receives a request for the recipient information from the sender, wherein
when the request is made from the sender through the receiving unit, the transmitting unit transmits the recipient information.

4. The system according to claim 1, wherein
the output unit further controls a display to display that the document data for which the recipient information is to be created by the recipient information creating unit has been transmitted by the sender.

5. The system according to claim 1, wherein the one or more hardware processors are further configured to implement:
an imparting unit that imparts specifying information for uniquely specifying the document data, to the document data output by the output unit.

6. The system according to claim 1, wherein the system further comprises:
a first terminal device, comprising a fourth of the hardware processors, configured to transmit instructions from the sender to the first image processing apparatus instructing the first image processing apparatus to create the document image and to store the setting information.

7. The system according to claim 1, wherein the setting information comprises delivery certification setting information instructing the server whether to instruct the second image processing apparatus to certify an output of the document data by the recipient by the second image processing apparatus.

8. The system according to claim 1, wherein the recipient information comprises an image and a name of the recipient, a date and time that the document image is printed on paper, a district name and a building name as the place, and a certification number identifying recipient information.

9. The system according to claim 8, wherein the server is further configured to transmit the recipient information to the first image processing apparatus in response to receiving the recipient information from the second image processing apparatus, wherein the first image processing apparatus is further configured to print the recipient information on paper in response to receiving the recipient information from the server.

10. An output apparatus comprising:

one or more hardware processors are configured to implement:

an output unit that outputs document data transmitted from a sender; and a recipient information creating unit that creates recipient information related to a recipient who outputs the document data, after the document data is output by the output unit, wherein the recipient instructs an output of the document data to occur at a place, wherein the recipient information indicates the place, wherein the document data is transmitted from a sender at a first image processing apparatus, comprising a first of the hardware processors, configured to receive the document data from the sender, the document data comprising a created document image and setting information;

wherein the output apparatus is further configured to receive the document data from a server, comprising a second of the hardware processors, configured to receive the document data from the first image processing apparatus and to transmit the document image to a second image processing apparatus, of the output apparatus, in response to a request for the document image from the second image processing apparatus, wherein the second image processing apparatus, comprising a third of the hardware processors and the recipient information creating unit, is configured to request the document image from the server, to print the document image on paper in response to an instruction from the recipient and to transmit the recipient information to the server, and wherein the first image processing apparatus is configured to print on paper.

11. A server device comprising:

one or more hardware processors are configured to implement:

a receiving unit that receives recipient information which is created after document data is output by an output unit and which is related to a recipient who outputs the document data using the output unit; and a transmitting unit that transmits the recipient information received by the receiving unit to a sender of the document data, wherein the recipient instructs an output of the document data to occur at a place, wherein the recipient information indicates the place, wherein the document data is transmitted from a sender at a first image processing apparatus, comprising a first of the hardware processors, configured to receive the document data from the sender, the document data comprising a created document image and setting information;

wherein the at least one or more hardware processors of the server device is configured to receive the document data from the first image processing apparatus and to transmit the document image to a second image processing apparatus in response to a request for the document image from the second image processing apparatus, wherein the second image processing apparatus, comprising a third of the hardware processors and the recipient information creating unit, is configured to request the document image from the server device, to print the document image on paper in response to an instruction from the recipient and to transmit the recipient information to the server device, and wherein the first image processing apparatus is configured to print on paper.

\* \* \* \* \*